United States Patent
Denks et al.

(10) Patent No.: US 11,512,364 B2
(45) Date of Patent: Nov. 29, 2022

(54) METHOD FOR PRODUCING A HOT STRIP OF A BAINITIC MULTI-PHASE STEEL HAVING A ZN—MG—AL COATING, AND A CORRESPONDING HOT STRIP

(71) Applicant: Salzgitter Flachstahl GmbH, Salzgitter (DE)

(72) Inventors: Ingwer Denks, Wolfenbüttel (DE); Christian Pelz, Wolfenbüttel (DE); Maik Habermann, Osterode (DE); Michael Braun, Lehre (DE); Stefan Mecke, Vechelde (DE); Ansgar Geffert, Hohenhameln (DE); Nils Köpper, Harsum (DE)

(73) Assignee: Salzgitter Flachstahl GmbH, Salzgitter (DE)

( * ) Notice: Subject to any disclaimer, the term of this patent is extended or adjusted under 35 U.S.C. 154(b) by 196 days.

(21) Appl. No.: 16/941,192

(22) Filed: Jul. 28, 2020

(65) Prior Publication Data

US 2020/0387685 A1 Dec. 10, 2020

Related U.S. Application Data

(62) Division of application No. 15/745,366, filed as application No. PCT/EP2016/066682 on Jul. 13, 2016, now abandoned.

(30) Foreign Application Priority Data

Jul. 17, 2015 (DE) .................. 10 2015 111 683.9
Sep. 9, 2015 (DE) .................. 10 2015 115 155.3

(51) Int. Cl.
*C21D 9/52* (2006.01)
*C21D 6/00* (2006.01)
(Continued)

(52) U.S. Cl.
CPC .............. *C21D 9/52* (2013.01); *B32B 15/01* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0263* (2013.01); *C21D 8/0284* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/44* (2013.01);
(Continued)

(58) Field of Classification Search
None
See application file for complete search history.

(56) References Cited

U.S. PATENT DOCUMENTS

| 2008/0202639 A1 | 8/2008 | Tomida et al. |
| 2010/0221573 A1 | 9/2010 | Drillet et al. |

(Continued)

FOREIGN PATENT DOCUMENTS

| CN | 103361588 | 10/2013 |
| CN | 106119699 | 11/2016 |

(Continued)

OTHER PUBLICATIONS

"Nitrooen in Steels, Part One". Jun. 2007.

(Continued)

*Primary Examiner* — Anthony M Liang
(74) *Attorney, Agent, or Firm* — Henry M. Feiereisen LLC

(57) ABSTRACT

The invention relates to a method for producing a hot-rolled strip composed of a bainitic multi-phase steel and having a Zn—Mg—Al coating, comprising the following steps: melting a steel melt containing (in weight percent): C: 0.04-0.11, Si: $\leq$0.7, Mn: 1.4-2.2, Mo: 0.05-0.5, Al: 0.015-0.1, P: up to 0.02, S: up to 0.01, B: up to 0.006, and at least one element from the group Nb, V, Ti in accordance with the following condition: $0.02\leq$Nb+V+Ti$\leq 0.20$, the remainder being iron including unavoidable steel-accompanying elements resulting from the melting process, casting the steel melt into a preliminary material, in particular a slab or a block or a thin slab, hot rolling the preliminary material into a hot-rolled strip having a final rolling temperature in the range of 800 to 950° C., cooling the hot-rolled strip to a winding temperature less than 650° C., winding the hot-rolled strip at a winding temperature less than 650° C., cooling the wound hot-rolled strip to room temperature in still air, wherein the microstructure of the wound hot-rolled strip then has a bainite fraction greater than 50% after the hot rolling, heating the hot-rolled strip to a temperature greater than 650° C. and less than Ac3, in particular less than Ac1+50° C., cooling the hot-rolled strip to zinc bath temperature, hot-dip coating the heated hot-rolled strip in a zinc alloy molten bath containing (in weight percent): Al: 1.0-2.0, Mg: 1.0-2.0, the remainder being zinc and unavoidable impurities. The invention further relates to the hot-rolled strip produced in accordance with the method above and to shaped, dynamically highly loadable components, in particular motor vehicle parts, that are produced from said hot-roiled strip and that are resistant to corrosive and abrasive influences.

14 Claims, No Drawings

(51) Int. Cl.

| | |
|---|---|
| *C21D 8/02* | (2006.01) |
| *C23C 2/06* | (2006.01) |
| *C23C 2/40* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 18/00* | (2006.01) |
| *C22C 38/00* | (2006.01) |
| *C23C 2/02* | (2006.01) |
| *C22C 18/04* | (2006.01) |
| *C22C 38/24* | (2006.01) |
| *C23C 30/00* | (2006.01) |
| *C22C 38/44* | (2006.01) |
| *B32B 15/18* | (2006.01) |
| *C22C 38/46* | (2006.01) |
| *B32B 15/01* | (2006.01) |
| *C22C 38/50* | (2006.01) |
| *C23C 2/26* | (2006.01) |
| *C22C 38/22* | (2006.01) |
| *B32B 15/04* | (2006.01) |
| *C22C 38/48* | (2006.01) |
| *C23C 2/28* | (2006.01) |
| *G09G 3/3208* | (2016.01) |
| *G06V 40/13* | (2022.01) |
| *G06V 40/12* | (2022.01) |

(52) U.S. Cl.
CPC .............. *C22C 38/46* (2013.01); *C22C 38/48* (2013.01); *C22C 38/50* (2013.01); *C23C 2/02* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *G06V 40/1318* (2022.01); *G06V 40/1365* (2022.01); *G09G 3/3208* (2013.01); *C21D 2211/002* (2013.01); *G09G 2354/00* (2013.01); *G09G 2360/14* (2013.01); *Y10T 428/12799* (2015.01); *Y10T 428/12951* (2015.01); *Y10T 428/12958* (2015.01); *Y10T 428/12965* (2015.01)

(56) References Cited

U.S. PATENT DOCUMENTS

| | | |
|---|---|---|
| 2014/0034196 A1 | 2/2014 | Wedemeier et al. |
| 2014/0311631 A1 | 10/2014 | Hayashi et al. |
| 2015/0225831 A1 | 8/2015 | Riener et al. |
| 2015/0329950 A1 | 11/2015 | Azuma et al. |

FOREIGN PATENT DOCUMENTS

| | | | |
|---|---|---|---|
| DE | 101 30 774 | 12/2002 | |
| DE | 102011117572 | 8/2012 | |
| EP | 1 621 645 | 2/2006 | |
| EP | 1621645 A1 * | 2/2006 | ............. B32B 15/01 |
| EP | 2 020 451 | 2/2009 | |
| EP | 2 692 894 | 2/2014 | |
| EP | 2 703 515 | 3/2014 | |
| JP | 2000-096202 | 4/2002 | |
| JP | 2003-321739 | 11/2003 | |
| JP | 2009-019265 | 1/2009 | |
| KR | 1020100037147 | 4/2010 | |
| KR | 10-1199069 | 11/2012 | |
| KR | 1020120121811 | 11/2012 | |
| RU | 2 518 870 | 6/2013 | |
| RU | 2 485 202 | 6/2014 | |
| WO | WO 2006/002843 | 1/2006 | |
| WO | WO 2012/100762 | 8/2012 | |
| WO | WO 2013/113304 | 8/2013 | |
| WO | WO 2014/033153 | 3/2014 | |
| WO | WO 2014/132968 | 9/2014 | |

OTHER PUBLICATIONS

K.W. Andrews: Empirical formulae for the calculation of some transformation temperatures, in: Journal of the Iron and Steel Industry, Jul. 1985.

Jean-Claude Calmon et al.: "Laminage à frois des produits plats", in: Techniques de l'Ingènier, Oct. 10, 1994.

Robert Alberny: "Laminage à chaud des produits plats sur trai à bandes. Partie 2", in: Techniques de l'Ingénier, Mar. 10, 2007.

* cited by examiner

METHOD FOR PRODUCING A HOT STRIP OF A BAINITIC MULTI-PHASE STEEL HAVING A ZN—MG—AL COATING, AND A CORRESPONDING HOT STRIP

CROSS-REFERENCES TO RELATED APPLICATIONS

This application is a divisional of prior filed copending U.S. application Ser. No. 15/745,366, filed Jan. 16, 2018, the priority of which is hereby claimed under 35 U.S.C. § 120 and which is the U.S. National Stage of International Application No. PCT/EP2016/066682, filed Jul. 13, 2016, which designated the United States and has been published as International Publication No. WO 2017/012958 and which claims the priorities of German Patent Applications, Serial No. 10 2015 111 683.9, filed Jul. 17, 2015, and Serial No. 10 2015 115 155.3, filed Sep. 9, 2015, pursuant to 35 U.S.C. 119(a)-(d).

BACKGROUND OF THE INVENTION

The invention relates to a method for producing a hot strip of a bainitic multi-phase steel having a Zn—Mg—Al coating, to a hot strip of a bainitic multi-phase steel having a Zn—Mg—Al coating, and to a use of a corresponding hot strip for producing deformed components which can have dynamically high loads applied thereto and are resistant to corrosive and abrasive effects, in particular motor vehicle parts.

German patent application DE 10 2011 117 572 A1 discloses a multi-phase steel having a dual-phase, bainitic-phase or complex-phase microstructure and a method for producing a cold-rolled or hot-rolled steel strip produced from this multi-phase steel. This steel strip is then hot-dip coated with a coating of zinc or zinc-magnesium. The coated steel strip comprises an optimized combination of high strength, good deformability and good corrosion protection and is particularly suitable for use in the field of vehicle body construction. The multi-phase steel includes the elements (contents are in weight percent and relate to the steel melt): C 0.060 to <=0.115, Al 0.020 to <=0.060, Si 0.100 to <=0.500, Mn 1.300 to <=2.500, P<=0.025, S<=0.0100, Cr 0.280 to <=0.480, Mo<=0.150, Ti 0.005 to <=0.050, Nb 0.005 to <=0.050, B 0.0005 to <=0.0060, N<=0.0100 and the remainder is iron, including typical steel-associated elements not previously mentioned. A pre-strip continuously cast from this multi-phase steel is hot-rolled to form a hot strip and is then continuously annealed. Tests are said to have shown that the microstructure proportions set after the continuous annealing are retained after the subsequent hot-dip coating at temperatures of 420 to 470° C.

Furthermore, international patent application WO 2014/033153 A1 discloses a method for applying a zinc-based protective coating on a flat steel product, and a flat steel product having a corresponding protective coating. The protective coating is a Zn—Mg—Al layer system which, in addition to corrosion protection, also offers a homogeneous and smooth surface. The protective coating is applied by means of hot-dip coating in a metallic bath which is composed in accordance with the following alloy concept (in each case in weight percent). The aluminium content is greater than the magnesium content. The aluminium content is in the range between 1.8 wt. % and 3.0 wt. %. The magnesium content is between 1.3 wt. % and 2.7 wt. %. The ratio of magnesium content to the sum of the aluminium content and of the magnesium content is in the range between 0.31 wt. % and 0.44 wt. %. The remainder of the alloy is zinc and unavoidable impurities, the sum of which is considerably less than 1 wt. %. In this regard, there should be a relationship between the melt, the solidification thereof on the flat product and the visual appearance and quality of the solidified surface. The aim should be to form a ternary eutectic of the metals Zn, Mg and Al upon solidification of the protective layer. Until the ternary eutectic is achieved, only primary zinc dendrites should be produced. Fluctuations in the alloy contents of the melt can result in the magnesium-rich or aluminium-rich channel being reached prior to the ternary eutectic being achieved, and therefore, in addition to the zinc primary precipitation, binary precipitations of $MgZn_2$ and Zn and/or aluminium-rich zinc phase occur to a small degree. The content of the binary precipitated Mg- or Al-rich phase should always be less than 10 weight percent. Accordingly, a quasi-single-phase solidification route should be achieved. Such protective coatings should meet the requirements of the automotive industry.

Furthermore, international patent application WO 2006/002843 A1 describes another protective coating consisting of a Zn—Mg—Al alloy. The melt comprises, in weight percent, an aluminium content in the range between 0.6 wt. % and 2.3 wt. %. The magnesium content is between 0.3 wt. % and 2.3 wt. %. An aluminium content above 2.3 wt. % is said to deteriorate the weldability. A magnesium content above 2.3 wt. % is said to deteriorate the surface.

Accordingly, the object of the present invention is to provide another method for producing a hot strip of a bainitic multi-phase steel having a Zn—Mg—Al coating, and a corresponding hot strip.

SUMMARY OF THE INVENTION

This object is achieved by a method for producing a hot strip of a bainitic multi-phase steel having a Zn—Mg—Al coating having the features of claim 1, and by a hot strip of a bainitic multi-phase steel having a Zn—Mg—Al coating having the features of claim 13. Advantageous embodiments of the invention are described in the dependent claims.

In accordance with one aspect of the invention, the object is achieved by a method for producing a hot strip comprised of a bainitic multi-phase steel having a Zn—Mg—Al coating, which method includes the steps of:

smelting a steel melt containing (in weight percent): C: 0.04-0.11, Si: <=0.7, Mn: 1.4-2.2, Mo<=0.5, Al: 0.015-0.1, P: up to 0.02, S: up to 0.01, B up to 0.004, and at least one element from the group Nb, V, Ti according to the following condition: 0.02<Nb+V+Ti<=0.20, with the remainder being iron and unavoidable elements being steel-associated or a result of smelting, casting the steel melt to form a precursor material, in particular a slab or a block or a thin slab, hot rolling the precursor material to form a hot strip having an end rolling temperature in the range of 800 to 950° C., cooling the hot strip to a reeling temperature of less than 650° C., reeling the hot strip at a reeling temperature of less than 650° C., cooling the reeled hot strip to room temperature in stationary air, wherein the microstructure of the reeled hot strip then has a bainite content of greater than 50%, heating the hot strip to a temperature of greater than 650° C. and less than Ac3, in particular less than Ac1+50° C., cooling the hot strip to zinc bath temperature, hot-dip coating the heated hot strip in a zinc alloy melt bath containing (in weight percent) Al: 1.0-2.0, Mg: 1.0-2.0, with the remainder being zinc and unavoidable impurities. The coated and bainitic hot strip produced in accordance with this method is characterized by an optimized combination of high strength, excellent deformability, good corrosion protection and good welding suitability. The bainitic microstructure is achieved inter alia by virtue of the fact that the hot strip is reeled after hot rolling at a temperature of less than 650° C. The excellent deformability combined with the coating which remains fixedly connected to the material of the hot strip during deformation prove to be advantageous. In this way, complex component geometries can also be produced without inserts, such as e.g. bearing shells or covers, having to be welded into the structure. As a result, this material can preferably be used in the field of undercarriage components. In this field, the material is subjected to large loads which occur suddenly and at high amplitudes and prohibit the use of a welded component or rather which have to result in structural adaptations when determining suitable weld seam designs, which adaptations result in an excess material consumption and thus an unnecessary increase in weight. The Zn—Mg—Al coating is barely removed in a deforming tool during the cold-deformation, in particular owing to the excellent adhesion of the coating on the hot strip and the low frictional coefficients of the coating, and therefore less cleaning time is required during processing in the pressing plant. --.

Moreover, owing to the chemical composition of the carrier material in the form of the bainitic multi-phase steel and the Zn—Mg—Al coating, good weldability is achieved. Therefore, this material can also be used in components whose structure requires good weldability and good deformability.

The Zn—Mg—Al coating offers additional corrosion protection, with respect to dip coating, on the finished motor vehicle. In an advantageous manner, the chemical composition of the bainitic multi-phase steel is set such that, despite the heating of the hot strip to a temperature less than Ac3, in particular less than Ac1+50° C., the properties, in particular the microstructure, of the multi-phase steel are retained. The chemical composition is set such that hardening and softening processes substantially allow the initial strength to be maintained or slightly increased. The adhesion of the Zn—Mg—Al coating is positively influenced by the heating to a temperature of greater than 650° C.

In addition to the bainite content of greater than 50% obtained after hot rolling, contents of other phases such as e.g. martensite and/or ferrite can also be isolately included.

In conjunction with the present invention, the precursor material can be produced by continuous casting, strip casting or ingot casting. In particular, slabs having a thickness of more than 100 mm to 450 mm can be used as the precursor material.

In a particularly energy-saving manner, heating the hot strip at a temperature of greater than 650° C. and less than Ac3, in particular less than Ac1+50° C., takes place in one working step and the hot strip is hot-dip coated immediately after the heating and cooling to zinc bath temperature. Re-heating is thus avoided. The heating converts the microstructure of the hot strip from bainite into annealed bainite.

Provision is preferably made that the hot strip is hot-dip coated in a zinc alloy melt bath at a bath temperature of 405 to 470° C., preferably 410 to 430° C.

Provision is advantageously made that the steel to be smelted has a C content of 0.06 to 0.10 weight percent and an Si content of 0.05 to 0.50 weight percent, and additionally the elements Nb, V and Ti, the total of the contents of Nb+V+Ti is in a range of 0.05 to 0.20 weight percent.

Preferably, the steel to be smelted has, in relation to the alloyed element(s) from the group Nb, V, Tl, a content of at least 0.005 weight percent in each case.

It is particularly advantageous that the sum of its Ti and Mo contents is >0.1 weight percent.

Since the hot-dip coated hot strip has a tensile strength Rm of 780 to 980 MPa and a yield strength ReH of at least 680 MPa, components, in particular of a motor vehicle, can be produced with thin walls and a high stability. The values for the tensile tests apply for transverse test pieces.

An elongation at fracture A, determined for the hot-dip coated hot strip, pursuant to DIN EN ISO 6892-1:2009 of at least 10% at nominal thicknesses of 1.80 to 3.00 mm or of at least 12% at nominal thicknesses of 3.01 to 3.50 permit excellent cold-deformability of the components, in particular of a motor vehicle. For the tests, pursuant to DIN 50 125, the test piece body A80 was used for a nominal thickness of less than 3 mm and the test piece body A5 was used for a nominal thickness of greater than or equal to 3 mm.

In accordance with another aspect of the invention, the object is achieved by a hot strip produced of a bainitic multi-phase steel having a Zn—Mg—Al coating, in particular produced by being smelted from a steel melt containing (in weight percent) C: 0.04-0.11, Si: <=0.7, Mn: 1.4-2.2, Mo: 0.05-0.5, Al: 0.015-0.1, P: up to 0.02, S: up to 0.01, B up to 0.006, and at least one element from the group Nb, V, Ti according to the following condition: 0.02<=Nb+V+Ti<=0.20, with the remainder being iron and unavoidable elements being steel-associated or a result of smelting, hot-dip coated in a zinc alloy melt bath containing (in weight percent) Al: 1.0-2.0, Mg: 1.0-2.0, with the remainder being zinc and unavoidable impurities, wherein the microstructure of the hot strip after hot rolling has a bainite content of greater than 50%. The coated and bainitic hot strip is characterized by an optimized combination of high strength, excellent deformability and good corrosion protection. Owing to the chemical composition of the carrier material in the form of the bainitic multi-phase steel and the Zn—Mg—Al coating, good weldability is additionally achieved. The zinc alloy melt bath comprises, in addition to Zn, Mg and Al, unavoidable impurities which are typically Y, Ca, Ce, La, Ti, B as trace elements in an order of magnitude in total of less than 0.3 wt. %.

The development of the previously described method and of the coated bainitic hot strip can be traced back to theoretical considerations, simulations and implementation in practical tests (test melts, test piece coils).

The coated hot strip produced in particular according to the method is particularly suitable for producing deformed components which can have dynamically high loads applied thereto and are resistant to corrosive and abrasive effects, in particular motor vehicle parts, in particular with complex component geometries, such as e.g. axle components, spring struts, transverse control arms, undercarriage connecting rods, frames of batteries for electric cars or bulkhead plates. For this purpose, the coated hot strip is directly further processed or is deformed to form a welded tube and then further processed. In such components, the typical properties of the coated hot strip such as the high strength potential, good deformability and good corrosion protection associated with a reduction in weight are applied to the component. Owing to the good deformability, complex cold-deformed components can be produced from the coated hot strip whilst avoiding weld seams. The Zn—Mg—Al coating offers a cathodic corrosion protection on the finished motor vehicle which offers, in addition to the barrier protection effect of the dip coating, an active corrosion protection with a long range effect.

Typical dimensions for a corresponding hot strip are, for instance: thickness in mm: 1.40 to 3.50, width in mm: 900 to 1250.

The Zn—Mg—Al coating for use on a hot strip having a thickness of greater than 1.6 mm and in particular a high tensile and even thicker hot strip proves to be advantageous. The high forces occurring during deformation result, in known Zn coatings, in corresponding Zn abrasion in the tool which means that multiple cleaning and associated interruptions in production are necessary. The reason is the high shear forces within the coating which are formed when passing through the hold-down clamp. The Zn—Mg—Al coating contains differently solid phase contents which can endure the occurring shear forces. This results in considerably less, or no, abrasion. Therefore, more economic production is possible.

Alloy elements are generally added to the steel in order to influence specific properties in a targeted manner. An alloy element can thereby influence different properties in different steels. The effect and interaction generally depend greatly upon the quantity, presence of further alloy elements and the solution state in the material. The correlations are varied and complex. The effect of the alloy elements will be discussed in greater detail hereinafter.

Carbon (C) is considered to be the most important alloy element in steel. Setting a carbon content to at most 2.0 weight percent turns iron first into steel. Despite this fact, the carbon content is drastically reduced during the production of steel. Carbon is interstitially dissolved in the iron lattice owing to its small atomic radius. The solubility is at most 0.02 weight percent in the α-iron and is at most 2.06 weight percent in the β-iron. In dissolved form, carbon considerably increases the hardenability of steel. Owing to the lattice tensions produced in the dissolved state, diffusion processes are hindered and thus conversion processes are delayed. In addition, carbon promotes the formation of austenite, the austenite region is thus expanded at lower temperatures. As the forcibly dissolved carbon content increases, the lattice distortions and thus the strength values of the martensite increase. In addition, carbon is necessary to form carbides. One representative which occurs almost in every steel is cementite (Fe3C). However, substantially harder special carbides can be formed with other metals such as e.g. chromium, titanium, niobium and vanadium. Therefore, it is not only the type but also the distribution and extent of the precipitation which is of crucial significance for the resulting increase in strength. Therefore, in order to ensure, on the one hand, sufficient strength and, on the other hand, good weldability, the minimum C content is fixed to 0.04 weight percent and the maximum C content is fixed to 0.11 weight percent. Preferably, the minimum C content is fixed to 0.06 weight percent and the maximum C content is fixed to 0.10 weight percent.

During casting, silicon (Si) binds oxygen and therefore reduces segregations and impurities in the steel. Moreover, by means of mixed crystallization silicon increases the strength and yield strength ratio of the ferrite with the elongation at fracture only decreasing slightly. A further important effect is that silicon shifts the formation of ferrite towards shorter times and therefore permits the production of sufficient ferrite prior to quench hardening. The formation of ferrite causes the austenite to be enriched with carbon and stabilized. In addition, silicon stabilizes the austenite (no depletion of carbon) in the low temperature range specifically in the region of bainite formation by preventing the formation of carbide. In addition, at high silicon contents strongly adhering scale can form during the hot rolling, said scale possibly impairing the further processing. In the case of continuous galvanizing, silicon can diffuse to the surface during annealing and can form silicon oxides at that location. During the immersion phase in the zinc bath, silicon oxides can disrupt the formation of a closed adhesion layer between steel and zinc because they prevent wetting of the steel surface. As a result, the formation of an adhesion-promoting blocking layer is disrupted. This is manifested in a poor zinc adhesion and non-galvanized locations. For the aforementioned reasons, the maximum silicon content is fixed to 0.50 weight percent. Preferably, the minimum Si content is fixed to 0.05 weight percent and the maximum Si content is fixed to 0.50 weight percent.

Manganese (Mn) is added to almost all steels for the purpose of desulphurization in order to convert the noxious sulphur into manganese sulphides. Moreover, by means of mixed crystallization manganese increases the strength of the ferrite and shifts the α-/β-conversion towards lower temperatures. A main reason for alloying manganese in multi-phase steels is the considerable improvement in the potential hardness increase. By reason of the inhibition of diffusion, the perlite and bainite conversion is shifted towards longer times and the martensite starting temperature is decreased. In a similar manner to silicon, manganese can—at high concentrations on the surface—result in manganese oxides which can negatively influence the zinc adhesion behavior and the surface appearance. Therefore, the manganese content is fixed to 1.40 to 2.20 weight percent. The limit values are included.

Phosphorous (P) is a trace element from the iron ore and is dissolved in the iron lattice as a substitution atom. Phosphorous increases the hardness and improves the hardenability by means of mixed crystal solidification. However, attempts are generally made to lower the phosphorous content as much as possible because inter alia it exhibits a strong tendency towards segregation owing to its low diffusion rate and greatly reduces the level of toughness. The attachment of phosphorous to the grain boundaries generally causes grain boundary fractures. Moreover, phosphorous increases the transition temperature from tough to brittle behavior up to 300° C. During hot-rolling, near-surface phosphorous oxides at the grain boundaries can result in the formation of fractures. However, in some steels owing to the low costs and high increase in strength, it is used in small quantities (<0.1%) as a microalloy element. For instance, phosphorus is also partially used as a strength supporting agent in multi-phase steels. For the aforementioned reasons, the phosphorus content is limited to 0.02 weight percent.

Sulphur (S), like phosphorous, is bound as a trace element in the iron ore. It is generally not desirable in steel because it exhibits a strong tendency towards segregation and has a greatly embrittling effect. An attempt is therefore made to achieve amounts of sulphur in the melt which are as low as possible (e.g. by deep vacuum treatment). Furthermore, the sulphur present is converted by the addition of manganese into the relatively innocuous compound manganese sulphide (MnS). The manganese sulphides are often rolled out in lines during the rolling process and function as nucleation sites for the conversion. Primarily in the case of a diffusion-controlled conversion this produces a microstructure of pronounced lines and, in the case of a highly pronounced line formation, can result in impaired mechanical properties (e.g. pronounced martensite lines instead of distributed martensite islands, no isotropic material behavior, reduced elongation at fracture). For the aforementioned reasons, the sulphur content is limited to 0.01 weight percent.

Aluminium (Al) is generally alloyed to the steel in order to bind the oxygen and nitrogen dissolved in the iron. The oxygen and nitrogen are thus converted into aluminium oxides and aluminium nitrides. These precipitations can effect grain refinement by increasing the nucleation sites and can thus increase the toughness properties and strength values. Aluminium nitride is not precipitated if titanium is present in sufficient quantities. Titanium nitrides have a lower enthalpy of formation and are thus formed at higher temperatures. In the dissolved state, aluminium, like silicon, shifts the formation of ferrite towards shorter times and thus permits the formation of sufficient ferrite in the multi-phase steel. It also suppresses the formation of carbide and thus results in the austenite being stabilized. Therefore, the Al content is fixed to 0.015 to at most 0.10 weight percent.

Boron (B) forms nitrides and carbides with nitrogen and with carbon respectively; however, this is generally not desired. On the one hand, only a low amount of precipitations are formed owing to the low solubility and on the other hand these are mostly precipitated at the grain boundaries. In the dissolved state, in very small amounts, boron results in a considerable improvement in the potential hardness increase. The active mechanism of boron is not conclusively resolved. Hypothetically, it can be assumed that boron atoms are preferably attached to the austenite grain boundaries and at that location greatly delay the formation of ferrite upon cooling from the austenite region. As a result, the formation of bainite is promoted. The efficacy of boron is decreased as the grain size increases and the carbon content increases (>0.8 weight percent). An amount over 60 ppm additionally causes decreasing hardenability because boron carbides act as nuclei on the grain boundaries. Boron has an extremely high affinity to oxygen which can lead to a reduction in the boron content in regions near to the surface (up to 0.5 mm). In this connection, annealing at over 1000° C. is discouraged. This is also to be recommended because boron can result in an excessive coarse grain formation at annealing temperatures above 1000° C. For the aforementioned reasons, the B content is limited to a value of up to 0.006%.

Titanium (Ti) forms extremely stable nitrides (TiN) and sulphides (TiS$_2$) at high temperatures. They only partly dissolve in the melt in dependence upon the nitrogen content. If the thus produced precipitations are not removed with the slag, they form quite large particles in the material owing to the high formation temperature and are generally not conducive to the mechanical properties. A positive effect on the toughness is produced by binding of the free nitrogen and oxygen. Therefore, titanium protects other microalloy elements such as niobium against being bound by nitrogen. These can then optimally deploy their effect. Nitrides which are produced only at lower temperatures by lowering the oxygen and nitrogen content can additionally ensure effective hindrance of the austenite grain growth. Non-removed titanium forms, at temperatures from 1150° C., titanium carbides and can thus effect grain refinement (inhibition of the austenite grain growth, grain refinement by delayed recrystallization and/or increase in the number of nuclei in α/β conversion) and precipitation hardening. Titanium is thus alloyed optionally according to the condition 0.02<=Nb+V+Ti<=0.20 weight percent. Titanium is preferably alloyed according to the condition 0.05 weight percent<=Nb+V+Ti<=0.20 weight percent. It is particularly advantageous if provision is made that the sum Ti+Mo is >0.1 weight percent. If titanium is selected as an alloy element, the Ti content is at least 0.005 weight percent, whilst observing the aforementioned sum condition.

Niobium (Nb) effects considerable grain refinement because it effects a delay in the crystallization most effectively among all microalloy elements and additionally impedes the austenite grain growth. However, the strength-increasing effect is to be qualitatively estimated to be higher than that of titanium owing to the increased grain refinement effect and the larger number of strength-increasing particles (removal of the titanium from TiN at high temperatures). Niobium carbides are formed from approximately 1200° C. In conjunction with titanium which, as described above, removes the nitrogen, niobium can increase its strength-increasing effect by forming carbides in the low temperature range (relatively small carbide sizes). A further effect of the niobium is the delay of the α/β conversion and the reduction of the martensite starting temperature in the dissolved state. On the one hand, this occurs by the solute-drag effect and on the other hand by the grain refinement. This effects an increase in strength of the microstructure and thus also a higher resistance to expansion upon martensite formation. The use of niobium is limited by the quite low solubility threshold. Although this limits the amount of precipitations, it primarily effects an early formation of precipitate with quite coarse particles. The precipitation hardening can thus become effective in real terms primarily in steels with a low C content (higher supersaturation possible) and in hot deformation processes (deformation-induced precipitation). Niobium is thus alloyed optionally according to the condition 0.02<=Nb+V+Ti<=0.20 weight percent. Niobium is preferably alloyed according to the condition 0.05 weight percent<=Nb+V+Ti<=0.20 weight percent. If niobium is selected as an alloy element, the Nb content is at least 0.005 weight percent, whilst observing the aforementioned sum condition.

The carbide and nitride formation by vanadium (V) first begins at temperatures from about 1000° C. or even after the α/β conversion, i.e. substantially later than for titanium and niobium. Vanadium thus barely has a grain-refining effect owing to the low number of precipitates provided in the austenite. The austenite grain growth is also not hindered by the late precipitation of the vanadium carbides. Therefore, the strength-increasing effect is based virtually exclusively on the precipitation hardening. One advantage of the vanadium is the high solubility in the austenite and the high volume proportion of fine precipitates caused by the low precipitation temperature. Vanadium is thus alloyed optionally according to the condition 0.02<=Nb+V+Ti<=0.20 weight percent. Vanadium is preferably alloyed according to the condition 0.05 weight percent<=Nb+V+Ti<=0.20 weight percent. If vanadium is selected as an alloy element, the V content is at least 0.005 weight percent, whilst observing the aforementioned sum condition.

The addition of molybdenum (Mo) is effected, in a similar manner to the addition of chromium, to improve hardenability. The perlite and bainite conversion is shifted towards longer times and the martensite starting temperature is decreased. Moreover, molybdenum considerably increases the tempering resistance so that no losses in strength are to be expected in the zinc bath and effects an increase in strength of the ferrite owing to mixed crystallization. The Mo content is optionally alloyed in dependence upon the dimension, layout configuration and microstructure setting, wherein the minimum addition should then be 0.050 weight percent in order to achieve an effect. For cost reasons, the Mo content is fixed to at most 0.50 weight percent. It is particularly advantageous if provision is made that the sum Ti+Mo is >0.1 weight percent.

The coating is made of a zinc-based alloy having low contents of magnesium and aluminium (1.0 to 2.0 weight percent in each case) applied to a flat steel product in a hot-dipping method. In this case, the liquid metal bath having the Zn—Mg—Al melt approximately has a temperature in the range of 405 to 470° C., in particular 410 to 430° C. The desired layer thickness is typically set via stripping nozzles when the coated flat product exits the metal bath. Such Zn—Mg—Al coatings are characterized by a comparatively improved corrosion protection effect with a thinner layer thickness than in the case of pure zinc coatings. By saving material accordingly, this results in a lower weight and a thinner end product. Increased corrosion protection is achieved with the layer thickness remaining constant. The alloy with magnesium and aluminium positively influences the corrosion protection effect in a sustained manner. In a preferred manner, the magnesium content is in the range of 1.0 to 2.0 weight percent, preferably 1.4 to 1.8 weight percent, and the aluminium content is in the range of 1.0 to 2.0 weight percent, preferably 1.4 to 1.8 weight percent, wherein the magnesium content and the aluminium content are identical to each other. It is also possible to provide a Zn—Mg—Al melt, wherein the magnesium content is less than the aluminium content. In a preferred manner, the magnesium content is then in the range of 1.0 to 2.0 weight percent, preferably 1.0 to 1.2 weight percent, and the aluminium content is in the range of 1.0 to 2.0 weight percent, preferably 1.3 to 1.7 weight percent. In this case, the contents in weight percent of zinc, magnesium and aluminium are selected such that a two-stage solidification of the melt is achieved. In a first solidification step, zinc primary crystals are produced and in a second solidification step, a fine-grained ternary Zn—Al—Mg eutectic is formed. Forming a binary Zn—Mg eutectic and an aluminium-rich phase, as is typically produced during a three-stage solidification, is avoided as far as possible. As the alloy content of Mg and Al increases whilst maintaining the ratios of the weight percentages with respect to each other, it remains in the two-stage solidification route and results in a reduction in the forming content of primary zinc. With a magnesium content of 1.0 weight percent and an aluminium content of 1.5 weight percent, approximately 95% primary zinc is formed in the coating. A magnesium content of 1.2 weight percent and an aluminium content of 1.8 weight percent results in a reduction of primary zinc in the coating to 75%. The two-stage solidification route results in a coating having a more homogeneous surface appearance compared with a three-stage solidification route. Micro-folds on the surface are also avoided. The coating forms an oxide skin with MgO, $Al_2O_3$ and $MgAl_2O_4$. The Zn—Al—Mg coating offers an excellent corrosion protection with the layer support being constant and smaller than that of a standard hot-dip galvanized coating. Salt spray tests show a two to six-times higher corrosion resistance than a typical standard hot-dip galvanized coating. At the same time, the Zn—Al—Mg coating is convincing owing to the excellent lacquers bonding. A phosphate coating as an inorganic conversion layer on the metallic surface of the Zn—Al—Mg coating decisively contributes to the quality of the subsequent lacquering. The Zn—Al—Mg coating can be phosphate-coated in a manner typical for automobiles. The lacquering behavior is identical to the hot-dip galvanized surface or the electrolytically galvanized surface. Owing to the particular resistance to corrosion, even after processing, the Zn—Al—Mg coating offers an improved cutting edge protection. Owing to the production of smaller layer supports, resources are also protected by saving zinc. The frictional coefficients of the coating decisively influence the deformation behavior of the components to be produced. The frictional coefficient in the case of single-stage deformation processes is comparable with the hot-dip galvanized surface or with the electrolytically galvanized surface. In multi-stage deformation processes, cold welding does not take place, in contrast to standard hot-dip galvanized or electrolytically galvanized material. The flat product provided with the Zn—Al—Mg coating can be joined via resistance spot welding or laser beam welding, like a flat hot-dip galvanized product.

In the present case, the method and product have been described in relation to a coated bainitic hot strip. The same can also be applied to correspondingly coated metal sheets.

Advantageous embodiments of the invention are described in the dependent claims.

BRIEF DESCRIPTION OF THE FIGURES

None

DESCRIPTION OF PREFERRED EMBODIMENTS

None

What is claimed is:

1. A method for producing a hot strip of bainitic multiphase steel having a Zn—Mg—Al coating, said method comprising:
   smelting a steel melt consisting of, in weight percent,
   C: 0.04-0.11
   Si: ≤0.7
   Mn: 1.4-2.2
   Mo: 0.05-0.5
   Al: 0.015-0.1
   P: up to 0.02
   S: up to 0.01
   B up to 0.006
   and at least one element from the group Nb, V, and Ti according to the following condition:

$0.02 \leq Nb+V+Ti \leq 0.20$ with a remainder being iron and unavoidable impurities;
   casting the steel melt to form a precursor material;
   hot rolling the precursor material with an end rolling temperature in a range of 800 to 950° C. to form a hot strip;
   cooling the hot strip to a reeling temperature of less than 650° C.;
   reeling the hot strip at a reeling temperature of less than 650° C.;
   cooling the reeled hot strip to room temperature in stationary air, with the reeled hot strip having a microstructure with a bainite content of greater than 50% after hot rolling;
   heating the hot strip to a temperature of greater than 650° C. and less than Ac3;
   cooling the hot strip to a zinc bath temperature;
   hot-dip coating the hot strip in a zinc alloy melt bath containing, in weight percent,
   Al: 1.0-2.0
   Mg: 1.0-2.0
   with the remainder being zinc and unavoidable impurities, wherein the magnesium content in the zinc alloy melt bath is less than the aluminium content, such that the hot-dip coating of the heated hot strip in the zinc alloy melt bath results in a two-stage solidification of the melt in which in a first solidification stage, zinc primary crystals are produced and in a second solidification stage, a fine-grained ternary Zn—Al—Mg eutectic is formed.

2. The method of claim 1, wherein the precursor material is a slab or a block or a thin slab.

3. The method of claim 1, wherein the hot strip is heated to a temperature of greater than 650° C. and less than Ac1+50° C.

4. The method of claim 1, wherein annealing and heating the hot strip at a temperature of greater than 650° C. and less than Ac3 take place in one working step and the hot strip is hot-dip coated immediately after the heating and cooling to zinc bath temperature.

5. The method of claim 4, wherein the temperature of annealing and heating the hot strip is greater than 650° C. and less than Ac1+50° C.

6. The method of claim 1, wherein the hot strip is hot-dip coated in a zinc alloy melt bath at a temperature of 405 to 470° C.

7. The method of claim 6, wherein the bath temperature is of 410 to 430° C.

8. The method of claim 1, wherein the steel melt has a C content of 0.06 to 0.10 weight percent, an Si content of 0.05 to 0.50 weight percent, and a total of the contents of Nb+Ti is in a range of 0.05 to 0.20.

9. The method of claim 1, wherein the content of each of the alloying elements from the group Nb, V, and Ti is at least 0.005 weight percent and less than or equal to 0.20 weight percent.

10. The method of claim 1, wherein a sum of the Ti and Mo contents is >0.1 weight percent and 0.7 weight percent.

11. The method of claim 1, wherein the hot-dip coated hot strip has a tensile strength Rm of 780 to 980 MPa.

12. The method of claim 1, wherein the hot-dip coated hot strip has a yield strength ReH of at least 680 MPa.

13. The method of claim 1, wherein the hot-dip coated hot strip has an elongation at fracture A pursuant to DIN EN ISO 6892-1:2009 of at least 10%.

14. The method of claim 1, wherein the zinc alloy melt bath has the magnesium content in a range of 1.0 to 1.2 weight percent and the aluminium content in the range of 1.3 to 1.7 weight percent.

* * * * *